United States Patent [19]

Stalph

[11] Patent Number: 4,582,329

[45] Date of Patent: Apr. 15, 1986

[54] SEALING BEARING ARRANGEMENT WITH CONVEX BUSHING RING

[75] Inventor: Gunter J. Stalph, Windsor, Conn.

[73] Assignee: Combustion Engineering, Inc., Windsor, Conn.

[21] Appl. No.: 669,547

[22] Filed: Nov. 8, 1984

[51] Int. Cl.$^4$ .......................... F16J 15/26; F16J 15/30
[52] U.S. Cl. ...................... 277/106; 277/116; 277/237 R; 277/DIG. 4; 277/DIG. 6
[58] Field of Search ............... 277/102, 105, 106, 116, 277/169, 237, DIG. 4, DIG. 6

[56] References Cited

U.S. PATENT DOCUMENTS

| | | | |
|---|---|---|---|
| 1,562,195 | 11/1925 | Schenck | 277/105 X |
| 2,608,424 | 8/1952 | Everett | 277/106 |
| 3,010,741 | 11/1961 | Hoyer | 277/DIG. 4 X |
| 3,625,578 | 12/1971 | Loftés et al. | 277/58 X |
| 3,951,418 | 4/1976 | Dryer | 277/124 |
| 4,195,854 | 4/1980 | Bertin | 277/153 |
| 4,270,762 | 6/1981 | Johnston | 277/102 X |

FOREIGN PATENT DOCUMENTS

| | | | |
|---|---|---|---|
| 495076 | 8/1953 | Canada | 277/106 |
| 926435 | 5/1973 | Canada | 277/DIG. 6 |

Primary Examiner—Robert S. Ward

[57] ABSTRACT

A self-aligning bearing arrangement has a compressible packing (20) for forming a gas-tight seal between the outer housing (2) and a rotatable shaft (10). A bushing ring (22) supports the shaft (10) and accommodates any misalignment thereof by having an inner surface (26) of convex cross section. The bushing ring (22) is urged axially against the packing (20) by a drive plate (28) and urging means (30, 32).

6 Claims, 1 Drawing Figure

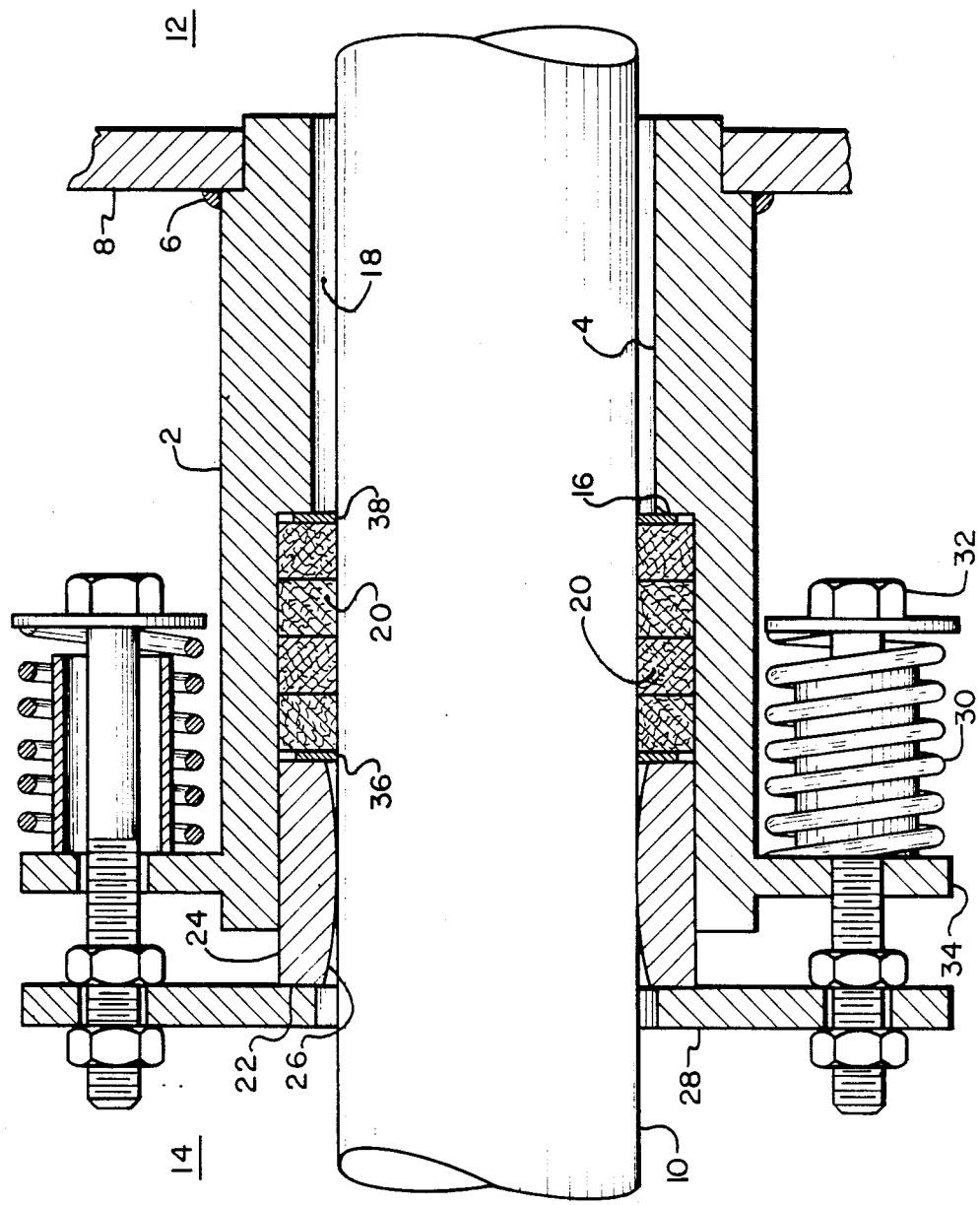

SEALING BEARING ARRANGEMENT WITH CONVEX BUSHING RING

FIELD OF THE INVENTION

The present invention relates to a bearing for supporting a rotatable shaft or the like, and more particularly, to a bearing for supporting a rotatable shaft wherein a gas-tight pressure seal must be maintained across the bearing.

BACKGROUND OF THE INVENTION

The passage of rotatable shafts across pressure boundaries is common in the power generation, heating, ventilating and air conditioning, and other process and energy industries. Such rotatable shafts must be both supported, typically with journal bearings or the like, and sealed, usually at the point of passage across a pressure barrier such as a duct wall or other gas tight membrane.

One typical situation occurs wherein a damper is disposed in a stream of flowing gas for the regulation thereof. The damper may be manipulated by means of a rotatable shaft passing out of the duct to engage an externally mounted actuator. As the gas pressure within the duct may be 2 or more psi greater than ambient. Although it is well known in the prior art to provide separate journal bearings and seals for the rotatable shaft in such applications, a bearing combining the sealing and support functions would greatly simplify and reduce the costs of construction and maintenance.

SUMMARY OF THE INVENTION

The bearing according to the present invention is well adapted for supporting a rotatable shaft, particularly in those situations wherein the shaft may be subject to misalignment and wherein there is a need to provide a gas tight seal across the bearing.

According to the present invention, a housing is provided with a compressible packing disposed in the annular gap between the shaft and the internal surface of the housing. A bushing ring, also located in the annular gap supports the shaft and accommodates any slight misalignment between the shaft and housing by having an interior surface with a convex axial cross section.

The bushing ring is urged inward against the packing, insuring a gas tight seal between the housing and the shaft. In the preferred embodiment, the bushing ring is urged inward by a plurality of springs compressed between a flange welded to the exterior of the housing and a series of bolts secured to an exterior drive plate acting on the bushing ring.

The bearing according to the present invention provides a simple, effective means for sealingly supporting a rotatable shaft. The bearing can accommodate a slight misalignment in the shaft without adversely affecting bearing performance, and the preferred embodiment has as an additional feature of graphite impregnated packing for providing lubrication to the bearing throughout the packing surface life.

BRIEF DESCRIPTION OF THE DRAWING FIGURE

The appended drawing FIGURE shows a cross section of the bearing according to the present invention taken at a plane passing through the axis of the rotatable shaft.

DESCRIPTION OF THE PREFERRED EMBODIMENT

Referring now to the drawing FIGURE, the bearing according to the preferred embodiment of the present invention can be seen as a housing 2 having a central bore 4 and being circumferentially welded 6 to a pressure containing membrane 8. A rotatable shaft 10 passes through the central bore 4 of the housing 2, running between the interior 12 of the pressure containing membrane or wall 8 and the exterior 14.

For simplicity, the axial direction sense running from left to right in the drawing FIGURE will be termed the "outward" direction, and the axial direction sense from right to left shall be termed "inward" hereinafter. It is to be understood that these directions are merely relative and set up for the convenience of describing the bearing according to the present invention and are not meant to imply a preferred orientation of the bearing with respect to the pressure differential across the membrane wall 8. Likewise, the interior 12 and exterior 14 may be reversed without altering the functionality and scope of the present invention.

Thus, the housing 2 is circumferentially and sealingly welded 6 about the inward end to the gas tight membrane 8. The central bore 4 includes a stop 16 shown in the preferred embodiment as a radial step 16 resulting from an increase in the bore diameter in the outward portion of the housing 2. The annular gap 18 between the shaft 10 and the housing 2 is filled outward of the stop 16 with packing 20 shown as a plurality of annular rings. This packing provides a seal between the housing 2 and the rotatable shaft 10, especially when compressed annularly.

The shaft 10 is supported by a bushing 22 disposed axially outward of the packing 20. The exterior surface 24 of the bushing ring 22 forms a rectalinear cylinder which fits closely within the central bore 4 of the housing 2. The interior surface 26 of the bushing ring 22 has a convex cross section resulting in a greater inner diameter at either end of the bushing ring 22 than at the center.

The convex surface 26 of the bushing ring 22 interior allows a slight misalignment of the shaft with respect to the central axis of the cylindrical housing 2. Such misalignment is common in applications such as air or flue gas damper control, and the ability of the present invention to accommodate such misalignment reduces the occurrence of binding in the bearing assembly.

The preferred embodiment of the present invention provides an exterior drive plate 28 disposed around the rotatable shaft 10 and in axial contact with the axially outward end of the bearing ring 22. The drive plate 28 is urged axially inward by an urging means, such as the spring 30 and bolt 32 shown in the preferred embodiment. The spring 30 and bolt 32 act between the drive plate 28 and the lug plate 34 shown secured to the housing 2.

The axial force exerted on the bushing ring 32 compresses the packing 20 resulting in a gas tight seal between the housing 2 and the shaft 10. The packing rings 20 may optionally be constructed of a graphite impregnated material which serves to lubricate the bushing inner surface 26 throughout the lifetime of the packing 20.

It is to be understood that the drive plate 22 may be urged inward by any one of a number of urging means well known in the art, including not only springs, but hydraulic, mechanical, pneumatic, gravitational, tortional, or other means adaptable to impart an axial force thereagainst. Additionally, the drive plate may be urged inward simply by the bolts 32 without the resiliant springs 30.

The preferred embodiment of the present invention also shows a pair of annular washers 36, 38 disposed on the axially inward and axially outward ends of the packing section 20 and, depending on the material composition of the packing 20 may provide additional support and strength thereto.

I claim:

1. A self-aligning bearing for supporting a rotatable cylindrical shaft, comprising:
   a housing, disposed around the shaft;
   an annular packing, disposed between the shaft and the bearing, for forming a gas-tight seal therebetween;
   a bushing ring, having an external surface closely fitting within the housing, and an internal surface of convex cross section, the bushing ring being disposed axially outward of the annular packing; and
   means for urging the bushing ring axially inward against the packing.

2. The bearing as recited in claim 1, wherein the urging means further comprises:
   a drive plate axially contacting the bushing ring at the outward end thereof; and
   a spring, acting between the drive plate and the housing for urging the drive plate axially inward.

3. The bearing as recited in claim 1, wherein the packing comprises a plurality of rings containing graphite.

4. A self-aligning bearing for supporting a rotatable elongated shaft passing through a fixed frame or the like, comprising:
   a cylindrical housing, disposed about the shaft and forming an annular gap therebetween, the housing further being sealingly secured to the frame;
   an annular packing, disposed within the annular gap for forming a gas-tight seal between the shaft and the housing;
   means, for retaining the packing against axially inward movement;
   a bushing ring, closely fitting within the housing and having an inner surface of convex axial cross section; and
   means for urging the bushing ring axially inward against the packing.

5. The bearing as recited in claim 4, wherein the urging means further comprises:
   a drive plate, disposed about the shaft outward of the bushing ring; and
   a spring, acting between the drive plate and the housing for urging the drive plate axially inward.

6. The bearing as recited in claim 5, wherein the packing contains graphite for lubricating the bushing ring during rotation of the shaft.

* * * * *